F. W. REEVES.
ELECTROMAGNET COIL.
APPLICATION FILED DEC. 28, 1909.
1,000,440.
Patented Aug. 15, 1911.
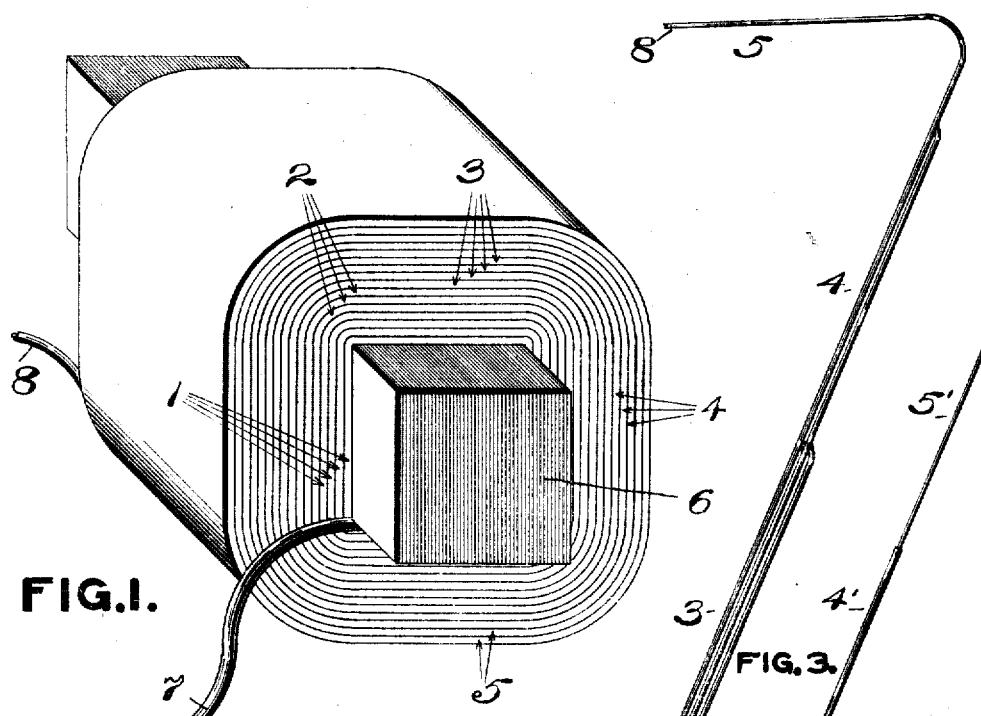
FIG. 1.
FIG. 2.
FIG. 3.
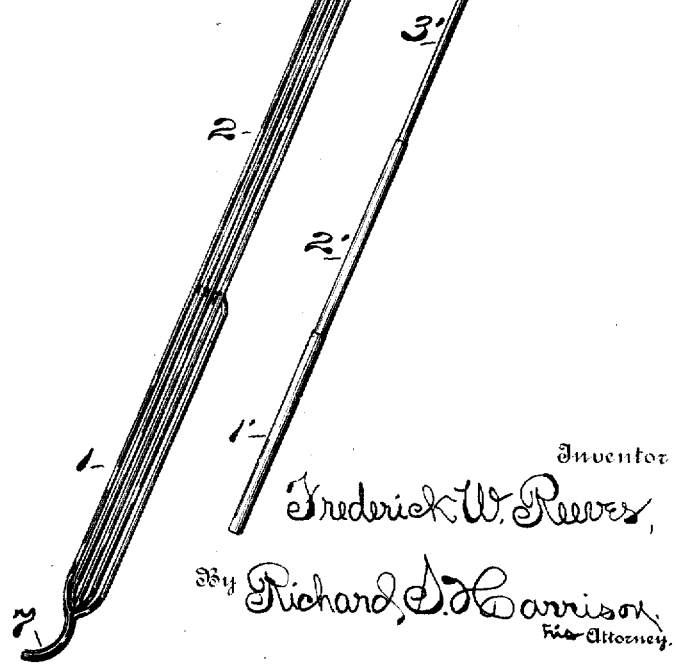
Witnesses:
M. E. Harrison.
E. R. Pafford.
Inventor
Frederick W. Reeves,
By Richard D. Harrison,
His Attorney.

UNITED STATES PATENT OFFICE.

FREDERICK W. REEVES, OF PITTSBURG, PENNSYLVANIA.

ELECTROMAGNET-COIL.

1,000,440.  Specification of Letters Patent.  Patented Aug. 15, 1911.

Application filed December 28, 1909. Serial No. 535,297.

*To all whom it may concern:*

Be it known that I, FREDERICK W. REEVES, a citizen of the United States, residing at Pittsburg, in the county of Allegheny and State of Pennsylvania, have invented certain new and useful Improvements in Electromagnet-Coils; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in coil winding for various purposes, being especially adapted for field magnets of generators and motors, transformers, induction coils, etc., and has for its objects to reduce the heating and increase the efficiency or magnetic effect with less loss of current.

I attain my objects by means of certain improvements in the winding of the coil, as will be hereinafter more fully set forth in the accompanying specification and pointed out in the appended claims.

In the accompanying drawings forming a part of this specification, Figure 1, is a perspective view of a simple form of magnet illustrating the complete application of the winding to a magnet core. Fig. 2, is a plan view of the preferred winding as it would appear were it straightened out. Fig. 3, is a similar view of a modified form of the winding.

The principles involved in my improved winding will be best understood by comparative statements of well known facts in connection with the description of the invention. If it be assumed, that a fluid conducting pipe be coiled and has several successive steps or connected sections, each one-half the cross-sectional area and double the coiled length of the preceding section, then the first section being twice the diametric area of the second section, and the second section twice as far around its coiled length as that of the first section, it will be readily apparent that if the fluid be supposed to flow through the pipe that it will exactly keep pace in the second section with that flowing in the first section.

Applying the progressive step principle to the winding of a magnet coil, by having that end of the conductor wire of the greatest cross-sectional area, and consequently less resistance, wound adjacent the magnet core, a higher amperage and more uniform flow of current throughout the coil is attained, thereby reducing the copper losses and applying the increased force to the magnet core. By this progressive step system of winding coils it can be readily understood that the current in each step is practically flowing in the same number of revolutions and in unison with one another throughout, it being borne in mind that the finer wire, at the outer part of the coil, will be necessary to maintain a uniform magnetic saturation throughout, said finer wire being a greater distance from the magnetic core it would require it to be a greater resistance to produce the same inductive action as the inner windings.

If the steps of the winding be made so that all the steps but the last one, forming the outer turns of the coil, be composed of plural strands progressively increased in each step toward the magnet core, even better results are attained, as, for instance, if the coil include five steps, with the first step nearest the magnet core composed of five parallel strands, the next step of four parallel strands, the next step of three parallel strands and the next one, adjacent the last step of a single strand, formed of two parallel strands, then the current in the step nearest the magnet core will have five paths of equal resistance and like current effect upon the magnet core, the next step of four strands will have four paths of equal resistance and like current effect, and so on, the resistance of the step strands increasing with the decrease in the number of strands and distance of the step from the magnet core upon which it be wound.

In Fig. 2, I have shown a conductor embodying the progressive series plural strand step principle, in which instance a series of five steps are shown, as an illustration, step 1 thereof beginning at the end 7 and including five parallel strands, step 2 including four parallel strands, step 3 including three parallel strands, step 4 two parallel strands and step 5 of a single strand terminating at the end 8.

In Fig. 1, I have shown a magnet core 6 having the progressive series plural-strand step conductor coiled thereon as it would appear in practice, it being understood that the said core 6 may be of any form other than that shown.

At Fig. 3 a variation in the form of winding conductor is shown, wherein the series step by step principle is employed without the multiple strands in which winding the first step is designated as 1', followed in order by step 2', step 3', step 4' and step 5', the first step being used for the inner layers, which winding in itself would greatly increase the efficiency of the coil over that of the ordinary form of the coil conductor of the same cross-sectional area throughout.

It will be evident that the winding as set forth, may be modified to accomplish the same results, without departing from the principles involved.

Having thus fully shown and described my invention, what I claim is:

1. A coil formed of a conductor having greater current carrying capacity at the inner than the outer turns, said coil winding being in the same direction throughout its entirety.

2. A coil having the turns formed into a series of steps, each individual step having a different resistance, said coil winding being in the same direction throughout its entirety.

3. A coil having the turns formed into a series of steps, each individual step having a different resistance, the step offering the least resistance being the innermost turns, said coil winding being in the same direction throughout its entirety.

4. A coil having the turns formed into a series of steps, each individual step having a different resistance and progressively arranged, the step offering the least resistance being the innermost turns, said coil winding being in the same direction throughout its entirety.

5. A coil having the turns formed into a series of steps, each individual step having a different resistance, the steps of lesser resistance being each formed of a plurality of parallel strands.

6. A coil having the turns formed into a series of steps, each individual step having a different resistance, the steps of lesser resistance being each formed of a plurality of parallel strands, the step of least resistance being the innermost turns.

7. A coil having the turns formed into a series of steps, each individual step having a different resistance and progressively arranged, the one of least resistance being the innermost turns, the steps offering the lesser resistance being each formed of a plurality of parallel strands.

8. A coil having the turns formed into a series of steps, each individual step having a different resistance, the steps of least resistances being each formed of a plurality of parallel strands, the step of least resistance being the innermost turns and the step of greatest resistance being the outermost turns.

9. A coil having the turns formed into a series of steps, each individual step having a different resistance, the steps of lesser resistances being respectively formed of a plurality of parallel strands of like length and resistance.

10. A coil having the turns formed into a series of steps, each individual step having a different resistance, the steps of lesser resistances being each formed of a plurality of parallel strands, the strands in any one step being of like length and resistance, the step of least resistance being the innermost turns.

11. A coil having the turns formed into a series of steps, each individual step having a different resistance and progressively arranged with the one of least resistance as the innermost turns, the steps of least resistances being each formed of a plurality of parallel strands, the strands in any one step being respectively of like length and resistance.

12. A coil having the turns formed into a series of steps, each individual step having a different resistance, the steps of least resistances being each formed of a plurality of parallel strands, the step of least resistance being the innermost turns and the step of greatest resistance being a single strand and forming the outer turns, the strands in any one of said steps being respectively of like length and resistance.

13. A coil having a series of steps of different resistances, the respective resistance steps being relatively arranged to produce the same magnetic induction throughout, said coil winding being in the same direction throughout its entirety.

14. A coil having a series of steps of different resistances increasing in proportion to the distance from the core upon which it is wound to cause the same magnetic induction throughout, said coil winding being in the same direction throughout its entirety.

15. An electro-magnet winding having varying resistances at different points, the part having the smaller resistance having the greater number of turns, substantially as described.

In testimony whereof, I affix my signature, in presence of two witnesses.

FREDERICK W. REEVES.

Witnesses:
D. B. OAKS,
R. S. HARRISON.